United States Patent [19]

Szekely, deceased et al.

[11] Patent Number: 4,889,555

[45] Date of Patent: Dec. 26, 1989

[54] PROCESS OF MAKING BINDERLESS BRIQUETS FROM STEELWORKS DUSTS

[75] Inventors: Ladislau Szekely, deceased, late of Wölfersheim, Fed. Rep. of Germany, by Helene Daniello, legal representative; Fred Stieler, Heusenstramm, Fed. Rep. of Germany

[73] Assignee: Metallgesellschaft Aktiengesellschaft, Frankfurt am Main, Fed. Rep. of Germany

[21] Appl. No.: 247,023

[22] Filed: Sep. 20, 1988

[30] Foreign Application Priority Data

Sep. 25, 1987 [DE] Fed. Rep. of Germany ....... 3732351

[51] Int. Cl.$^4$ .............................................. C22B 1/16
[52] U.S. Cl. ...................................... 75/0.5 R; 75/25; 264/125
[58] Field of Search ................................ 75/0.5 R, 25

[56] References Cited

U.S. PATENT DOCUMENTS 4,533,384  8/1985  Rellermeyer et al. .................. 75/25

Primary Examiner—Melvyn J. Andrews
Attorney, Agent, or Firm—Sprung Horn Kramer & Woods

[57] ABSTRACT

To produce smeltable briquets, steel-works dusts containing more that 15% metallic iron are heated in an indirectly heated rotary kiln to a briquetting temperature in excess of 500° C. under an atmosphere which is inert to the metallic iron. The heated dusts are briquetted in the briquetting roll press under an inert atmosphere and under a roll pressure from 60 to 150 kN/cm roll width. The hot briquets are separated from the fines under an inert atmosphere and are air-cooled to a temperature below 130° C. The fines are recycled to the rotary kiln.

4 Claims, 1 Drawing Sheet

PROCESS OF MAKING BINDERLESS BRIQUETS FROM STEELWORKS DUSTS

BACKGROUND OF THE INVENTION

This invention relates to a process of making binderless briquets from fine-grained steelworks dusts, which contain metallic iron, which briquets are intended for use in smelting processes, wherein the steelworks dusts are heated and in a hot state are briquetted on a briquetting roll press and the hot briquets are air-cooled.

In steelmaking, highly fine-grained dusts are collected, e.g., in the electrostatic precipitators used to dedust the exhaust gases from converters and electric arc furnaces. Said dusts have high contents of $Fe_2O_3$, FeO and metallic iron. The contents of CaO and MgO fluctuate greatly and may reach ranges from 3 to 30%.

Owing to the small particle size of the dusts collected in electrostatic precipitators, amounting to 60% below 0.045 mm, and the large surface area of said dusts, amounting to 7000 to 9300 $cm^2/g$, said dusts have a low bulk density of about 1000 $kg/m^3$ and a specific gravity of about 5 $g/cm^3$ and the metallic iron and FeO contained in said dusts have a high reactivity with oxygen or with oxygen-containing gases at temperatures above about 130° C. The total iron content is from 60 to 75%, the FeO content is usually from 15 to 25% and the content of metallic iron may be as large as about 24%.

In dusts collected in evaporative coolers, the contents of CaO and MgO exhibit the same fluctuations as in the dusts collected in electrostatic precipitators but such dusts have a considerably larger particle size of about 90% between 0.045 and 1 mm. Their bulk density is about 3000 $kg/m^3$ and their specific gravity about 6 $g/cm^3$. Their total iron content is about 80 to 93%, their FeO content about 2 to 10% and their metallic iron content about 70 to 88%. The metallic iron and the FeO contents are oxidized with oxygen from the environment at about 350° C.

Said dusts have such a high tendency to oxidize, that oxygen offered by the environment will result in an oxidation. An oxidation with decomposition of $CO_2$ will also be caused by $CO_2$ contained in flue gases. In an experiment conducted at a dust temperature of 650° C. it has been found that flue gases effect an oxidation of about 9.4% Fe to FeO accompanied by a decomposition of $CO_2$ into oxygen, CO and soot.

In view of these properties, said dusts cannot be stored and re-used in an untreated form.

German Patent Specification No. 3,223,203 teaches to briquet said dusts in that oxidizing gases are blown through the dusts at a temperature in excess of 200° C. and the oxidation of part of the metallic iron results in a heating of the dusts to 450° to 650° C. Briquetting is effected on a briquetting roll press under a roll pressure in excess of 6 kN/cm roll width. The hot briquettes are cooled in an air stream to a temperature below 100° C. The necessary reoxidation of the metallic iron offsets the work of reduction previously performed, which involved a large consumption of energy.

SUMMARY OF THE INVENTION

It is an object of the invention to briquet such dusts without a reoxidation in an economical production of briquets having a constant properties even in the case of fluctuating contents of metallic iron, FeO, CaO and MgO.

That object is accomplished in accordance with the invention in that the steelworks dusts, which contain more than 15% metallic iron, are heated to a briquetting temperature above 500° C. in an indirectly heated rotary kiln under an atmosphere which is inert to the metallic iron, the heated dusts are briquetted in the briquetting roll press under an inert atmosphere and under a roll pressure from 60 to 150 kN/cm roll width, the hot briquets are separated under an inert atmosphere from the fines, the briquets are air-cooled to a temperature below 130° C. and the fines are recycled to the rotary kiln.

One kind of dust or a mixture of dusts of several kinds may be used. In a heating furnace the rotary kiln is heated to the desired temperature from the outside by hot gases used as a heating fluid. The dusts are charged into the charging end of the rotary kiln and travel through the kiln and are at the desired temperature as they leave the kiln at its other end. That temperature lies between 500° and 850° C. and will depend on the kind of the dusts. The optimum temperature can be determined by experiments. An inert gas, preferably nitrogen, is introduced into the rotary kiln at its charging end and is withdrawn at the other end. The rotary kiln is sealed against an ingress of air. The hot dusts are fed to the briquetting roll press with an exclusion of air, preferably through an enclosed chute system. The matter discharged from the briquetting roll press is fed to sieving means for a separation of the fines, which are recycled to the rotary kiln. The entire system is under an inert atmosphere. The hot briquettes are rapidly cooled by air blown through the briquets, e.g., while they are carried by an apron conveyor.

In accordance with a preferred further feature the heated inert gas leaving the rotary kiln is recycled to the rotary kiln. In that case the inert gas is also re-used and its heat-content is also returned to the rotary kiln.

In accordance with a further preferred feature the fuel gas and/or the combustion air for heating the rotary kiln is preheated in a heat exchanger by the outflowing flue gas. This will decrease in a simple manner the amount of energy required for heating.

The invention will be explained more in detail with reference to the drawing and to an example.

BRIEF DESCRIPTION OF THE DRAWING

The FIGURE is a diagrammatic representation of a plant for briquetting the dusts.

DETAILED DESCRIPTION OF THE INVENTION

Figure 1:
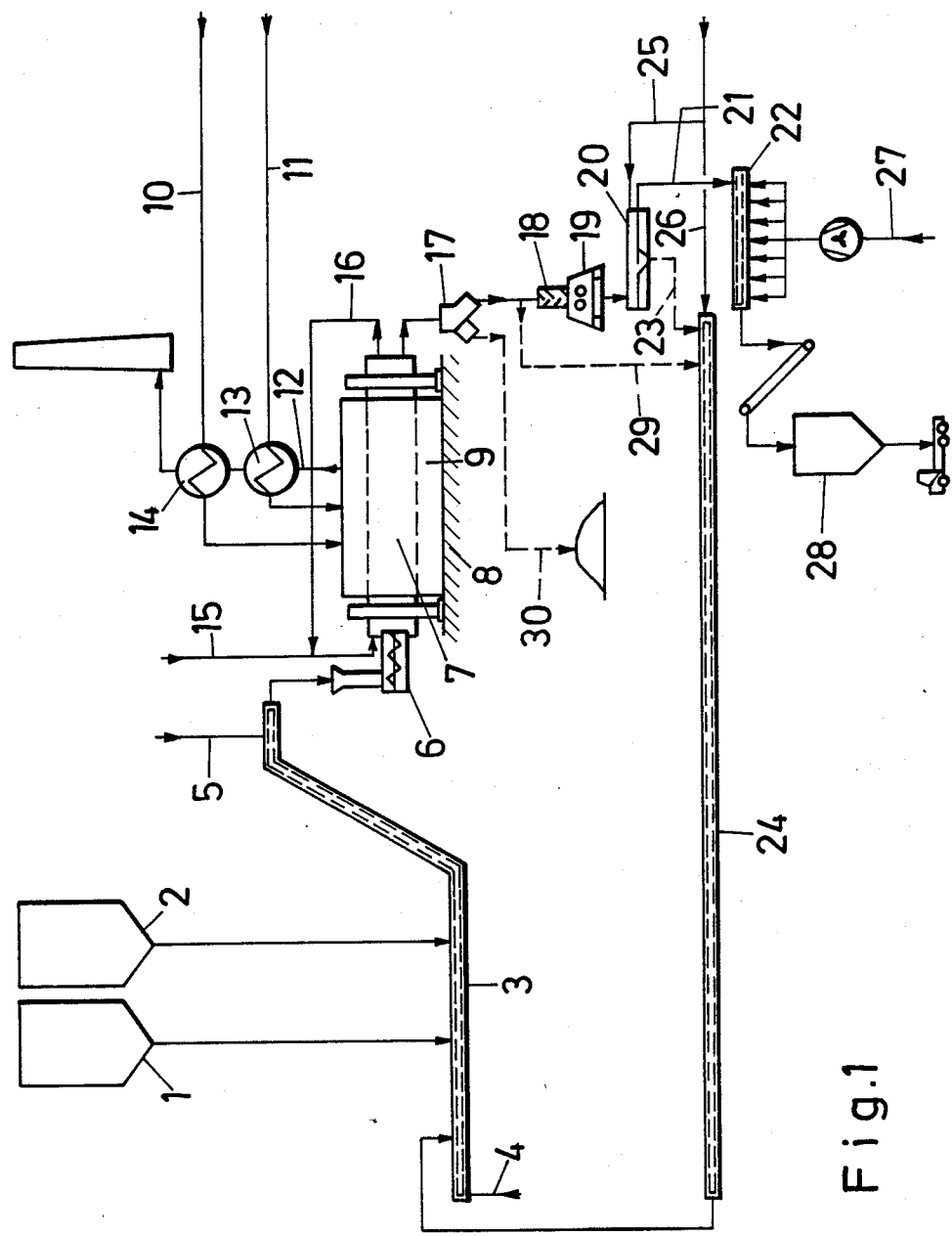

Dust collected in an electrostatic precipitator is withdrawn from a bin 1 and dust collected in an evaporative cooler is withdrawn from a bin 2. The withdrawn dusts are fed into the conveyor line 3 (enclosed continuous dragchain conveyor, bucket elevator), which is also supplied with nitrogen through lines 4 and 5. The dusts are charged from the conveyor line 3 into the screw conveyor 6 and from the latter into the rotary kiln 7 that is disposed in the heating furnace 8. Air from line 10 and fuel gas from line 11 are supplied to the annular space 9 of the heating furnace 8 and are burnt in the annular space 9. The exhaust gas is withdrawn from the annular space 9 via line 12 and is conducted through the heat exchangers 13 and 14, in which the air and the gas are preheated. Nitrogen is supplied to the rotary kiln 7 through line 15 and is withdrawn from the rotary kiln 7 and recycled through line 16. The heated dusts are discharged from the rotary kiln 7 into an enclosed chute system 17 and are charged from the latter to the charging screw conveyor 18 for delivering the dusts to the briquetting roll press 19. The matter discharged from the briquetting roll press 19 is fed to the sieving station 20, from which the hot briquets are delivered via line 21 onto the apron conveyor 22 whereas the fines are charged via line 23 into the conveyor line 24. Nitrogen is supplied through line 25 into the sieving station 20 and through line 26 into the conveyor line 24. Air from line 27 is blown through the briquets on the apron conveyor 22. The cooled briquets are fed into and carried away from the bin 28. The line 29 bypassing the briquetting roll press 19 may be used to recycle hot dusts through the conveyor line 24 to the rotary kiln 7. Dusts can be removed from the system through line 30.

All parts of the system are gas tightly interconnected also at those connections which are represented by simple lines for the sake of simplicity.

EXAMPLES

The rotary kiln had an inside diameter of 0.62 m and a length of 4.5 m and was heated by means of 6 burners. The dusts are heated under a nitrogen atmosphere. The throughput rate amounted to 250 kg/h.

A mixture was processed which consisted of 60% dust collected in an electrostatic precipitator and 40% dust collected in an evaporative cooler. Another mixture was processed which contained 50% of each of the two dusts. The dusts were heated to a temperature of 680° C. in experiment 1 and to a temperature of 600° C. in experiment 2.

The dusts had the following composition:

| Chemical composition | Dust collected in electrostatic precipitator | Dust collected in evaporative cooler |
|---|---|---|
| $Fe_{total}$ | 72.0% | 92.3% |
| $Fe_{met}$ | 21.7% | 88.3% |
| FeO | 24.4% | 2.1% |
| CaO | 3.0% | 4.5% |
| MgO | 0.26% | 0.05% |
| $SiO_2$ | 1.5% | 0.5% |
| $Al_2O_3$ | 0.17% | 0.1% |
| P | 0.07% | 0.04% |
| Mn | 0.62% | 0.16% |
| Zn | 1.2% | 0.08% |
| Pb | 0.17% | 0.05% |

The advantages afforded by the invention reside in that the dusts can be formed into briquets without reoxidation and the resulting briquets have very good properties even in the case of fluctuations in the composition of the dusts. The heating in the rotary kiln permits its capacity to be utilized in a constant degree even when the flow behavior of the dusts is changed in strong fluctuations of the contents of CaO and MgO so that a uniform discharge rate and uniform temperature will be assured. Because an effective sealing can be provided, nitrogen at a low rate will be sufficient for maintaining inert conditions.

What is claimed is:

1. In a process of making binder-free briquets from fine-grained steelworks dusts, which contain metallic iron, wherein the steelworks dusts are heated and in a hot state are briquetted on a briquetting roll press and the hot briquets are air-cooled, the improvement comprising: heating steelworks dusts which contain more than 15% metallic iron to a briquetting temperature above 500° C. in an indirectly heated rotary kiln under an atmosphere which is inert to the metallic iron, briquetting the heated dusts in the briquetting roll press under an inert atmosphere and under a roll pressure from 60 to 150 kN/cm roll width to produce hot briquets, separating the hot briquets under an inert atmosphere from fines produced during said briquetting, air-cooling the briquets to a temperature below 130° C. and recycling the fines to the rotary kiln.

2. A process according to claim 1, wherein heated inert gas exits the rotary kiln and is recycled back to the rotary kiln.

3. A process according to claim 1, wherein fuel gas and combustion air enter the rotary kiln and wherein at least one of the fuel gas and the combustion air for heating the rotary kiln is preheated in a heat exchanger by outflowing flue gas from the rotary kiln.

4. A process according to claim 2, wherein the inert gas is nitrogen.

* * * * *